United States Patent [19]

Shawl

[11] Patent Number: 5,614,017
[45] Date of Patent: Mar. 25, 1997

[54] CEMENT ADDITIVES

[75] Inventor: Edward T. Shawl, Wallingford, Pa.

[73] Assignee: ARCO Chemical Technology, L.P., Greenville, Del.

[21] Appl. No.: 621,669

[22] Filed: Mar. 26, 1996

[51] Int. Cl.$^6$ .................................................. C04B 24/24
[52] U.S. Cl. .................. 106/823; 106/728; 106/810; 524/5; 524/558; 526/318; 526/332
[58] Field of Search .................... 106/810, 728, 106/823; 524/5, 558; 526/318, 332

[56] References Cited

U.S. PATENT DOCUMENTS

| | | | |
|---|---|---|---|
| 4,473,406 | 9/1984 | Bradley et al. | 106/90 |
| 4,524,163 | 6/1985 | Bradley et al. | 524/5 |
| 4,792,360 | 12/1988 | Pierce et al. | 106/90 |
| 4,808,641 | 2/1989 | Yagi et al. | 524/5 |
| 4,814,014 | 3/1989 | Arfaei | 106/90 |
| 4,870,120 | 9/1989 | Tsubakimoto et al. | 524/5 |
| 4,888,059 | 12/1989 | Yamaguchi et al. | 106/314 |
| 4,946,506 | 8/1990 | Arfaei et al. | 106/724 |
| 4,946,904 | 8/1990 | Akimoto et al. | 525/327 |
| 4,968,734 | 11/1990 | Gaidis et al. | 524/5 |
| 4,972,025 | 11/1990 | Tsubakimoto et al. | 525/329 |
| 4,978,392 | 12/1990 | Kilbarger et al. | 106/95 |
| 5,142,036 | 8/1992 | Akimoto et al. | 536/18.3 |
| 5,162,402 | 11/1992 | Ogawa et al. | 524/5 |
| 5,254,723 | 10/1993 | Yang et al. | 560/240 |
| 5,319,006 | 6/1994 | Yang et al. | 523/500 |
| 5,362,324 | 11/1994 | Cerulli et al. | 106/823 |
| 5,393,343 | 2/1995 | Darwin et al. | 106/808 |
| 5,436,314 | 7/1995 | Yang et al. | 528/274 |
| 5,476,885 | 12/1995 | Tahara et al. | 524/4 |
| 5,478,521 | 12/1995 | Scheiner | 264/333 |
| 5,494,516 | 2/1996 | Drs et al. | 106/819 |
| 5,556,460 | 9/1976 | Berke et al. | 106/823 |

FOREIGN PATENT DOCUMENTS

| | | |
|---|---|---|
| 375252 | 3/1991 | Japan . |
| 5213644 | 8/1993 | Japan . |
| 2280180 | 1/1995 | United Kingdom . |
| 2285048 | 6/1995 | United Kingdom . |
| 9528362 | 10/1995 | WIPO . |

OTHER PUBLICATIONS

*Chemical Abstracts* 99:145063b, "Dispersing Agents for Cement", JP 58 74,552 (May 1983).
*Chemical Abstracts* 105:84233a "Cement Admixture", JP 61 31,333 (Feb. 1986).

*Primary Examiner*—Anthony Green
*Attorney, Agent, or Firm*—Stephen D. Harper

[57] ABSTRACT

Substances useful as water reducing and superplasticizer additives for cement compositions are formed by reaction of carboxylic acid polymers with polyethers of $C_2$–$C_4$ epoxides wherein partial cleavage of the polyether and esterification of the polyether and the cleavage products thereof by the other reactant are achieved. In one embodiment, a sulfonic acid is used to catalyze the reaction of poly(acrylic acid) and a monofunctional ethylene oxide-propylene oxide copolymer at a temperature in excess of 140° C.

24 Claims, No Drawings

CEMENT ADDITIVES

BACKGROUND OF THE INVENTION

1. Field of the Invention

The present invention relates to the use of polymeric additives comprised of the reaction product of a carboxylic acid polymer such as polyacrylic acid and a polyether of one or more $C_2$–$C_4$ epoxides as additives for cement. The invention also pertains to cement compositions containing these additives. The additives function as water reducers and super plasticizers.

2. Description of the Prior Art

Additives for cement to increase the fluidity of cement paste, mortars and concretes have been known and in use for many years. These additives are also known as water reducers because they allow less water to be used in a mortar or concrete without loss of slump (a measure of consistency or workability). This class of cement additives permits the use of less water to obtain the same slump, or the attainment of a higher slump at a given water content, or the use of less portland cement to realize the same compressive strength. The performance requirements for water reducing admixtures are specified in ASTM Method C494-92, "Standard Specifications for Chemical Admixtures for Concrete."

In ASTM C494-92, a water reducing admixture is defined as an admixture that reduces the quantity of mixing water required to produce concrete of a given consistency by at least 5%.

A high range water reducing admixture, also known as a superplasticizer, reduces the quantity of mixing water required to produce concrete of a given consistency by 12% or greater. Commercial water reducing admixtures include lignin sulfonates and naphthalene sulfonate-formaldehyde condensates. More recently, new classes of flow enhancers or water reducers have been described. U.S. Pat. No. 4,814,014 describes a cement composition containing a graft co-polymer containing a polymeric backbone moiety and polymeric side chain moieties wherein one of the polymeric moieties is a polyether moiety and the other is a non-polyether formed by polymerization of ethylenically unsaturated monomers. U.S. Pat. No. 5,393,343 describes a cement composition containing an imidized acrylic polymer made, for example, by reacting a polyacrylic acid of 2000 molecular weight with a polyethylene polypropylene oxide polymer of 2000 molecular weight terminated at one end by a primary amine group and at the other end by a methyl group.

The compositions of the prior art have not, however, been entirely satisfactory leaving much room for improvement.

BRIEF DESCRIPTION OF THE INVENTION

In accordance with the present invention, it has been found that the reaction products of certain carboxylic acid polymers and certain polyethers are unexpectedly effective as water reducing additives or superplasticizers in cement. In contrast to other conventional superplasticizers based on polyethers, the reaction products of the present invention perform well even at dosages as low as 0.1 weight % on cement, do not strongly entrain air, and are not substantially reduced in performance even when used in coordination with a defoamer. Additionally, the time to total slump loss is much longer using the additive of the present invention as compared to conventional superplasticizers. This is an important advantage, as the cement thereby remains workable over a greater period. A cementitious composition may set up before the composition is in place if sufficient slump cannot be sustained over a sufficiently long period, with unfortunate consequences.

DETAILED DESCRIPTION

The carboxylic acid polymers utilized in the preparation of the cement additives of the invention are comprised, in whole or in part, of one or more polymerizable acid monomers characterized by the presence of at least one polymerizable ethylenically unsaturated group in conjugation with a carboxylic acid, carboxylic anhydride or carboxylic ester group. "Acid" in this context thus refers to any moiety capable of functioning as an equivalent to or precursor to a free carboxylic acid group. Such monomers include monomers corresponding to the structure

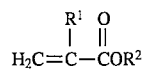

wherein $R^1$ and $R^2$ are each independently hydrogen or $C_1$–$C_4$ alkyl (e.g., methyl, ethyl, propyl, butyl). Other suitable monomers include cyclic unsaturated anhydrides and unsaturated dicarboxylic acids and $C_1$–$C_4$ alkyl esters thereof. Preferred acid monomers include, but are not limited to, acrylic acid, methacrylic acid, methyl methacrylate, methyl acrylate, maleic acid, maleic anhydride and combinations thereof. The carboxylic acid may be present in salt form, i.e., where $R^2$ is replaced with alkali metal, alkaline earth metal, ammonium, or the like. The carboxylic acid polymer thus may be in acid, partially neutralized, or fully neutralized salt form.

In certain embodiments of the invention, the polymer is comprised of repeating units having the structure

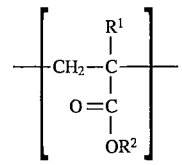

wherein $R^1$ is H or $C_1$–$C_4$ alkyl and $R^2$ is H, $C_1$–$C_4$ alkyl, alkali metal (e.g., Na, K), alkaline earth metal, or ammonium (e.g., $NH_4$, mono-, di-, or trialkylammonium, or quaternary ammonium); or

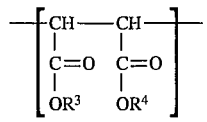

wherein $R^3$ and $R^4$ are the same or different and have the same meaning as $R^2$ above; or

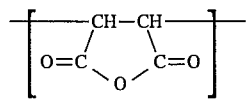

In one embodiment of the invention, the carboxylic acid polymer consists essentially of the acid monomer(s) in polymerized form (i.e., the acid monomer may comprise up to 100% of the polymer). However, satisfactory results may also be obtained even where the acid monomer is copolymerized with a different type of polymerizable monomer such as ethylene. Preferably, however, at least 25 mole % of the repeating units in the polymer are repeating units of the acid monomer. Acrylic acid homopolymer is particularly useful in the present invention. Aqueous solutions of poly-(acrylic acid) containing from 30 to 70% solids and having molecular weights of between 1000 and 4,000,000 are available from commercial sources such as BASF (under the trademark "Sokalan PA") and Aldrich Chemical Company. Poly(acrylic acid) is also commercially available in solid form.

In another preferred embodiment of the invention, a copolymer of maleic acid and acrylic acid is utilized. Such materials are available in solid or aqueous solution form from BASF under the trademark Sokalan CP (molecular weight=3000 to 70,000). Copolymers of this type have been found to be somewhat more reactive than acrylic acid homopolymers and have a somewhat greater tendency to form gels or solids, possibly due to excessive crosslinking of the reactants. The use of partially neutralized carboxylic acid polymers and the avoidance of conditions favoring free radical formation may help to control the degree of gelation or crosslinking.

Other examples of carboxylic acid polymers suitable for use in the present invention include, but are not limited to, poly(ethylene-co-acrylic acid), poly(ethylene-co-methacrylic acid), poly(ethylene-co-maleic anhydride), and poly-(methylmethacrylate-co-methacrylic acid).

The precise molecular weight of the carboxylic acid polymer is not particularly critical and may be varied as desired to control the properties of the resulting cement additive. Typically, however, the polymer has a number average molecular weight of from 500 to 2,000,000.

The other reactant utilized in the synthesis of the cement additives of the present invention is a polyether comprised of, in polymerized form, one or more $C_2$–$C_4$ epoxides. The polyether may thus be any homopolymer or copolymer having repeating units linked by ether linkages with two carbon atoms separating each ether linkage. Preferred $C_2$–$C_4$ epoxides include propylene oxide, ethylene oxide, and mixtures thereof. For example, the mole ratio of oxyethylene to oxypropylene repeating units in the polyether may vary from 1:99 to 99:1. Generally speaking, the incorporation of higher proportions of oxyethylene repeating units in the polyether will tend to increase the water solubility of the resulting cement additive. However, the use of oxyalkylene repeating units derived from substituted epoxides such as propylene oxide and 1-butene oxide tends to increase the susceptibility of the polyethers to undergo the desired partial cleavage during reaction with the ethylenically unsaturated carboxylic acid polymer. The polyether may additionally contain repeating units other than those derived from $C_2$–$C_4$ epoxides. Copolymers of $C_2$–$C_4$ epoxides with other cyclic ethers such as oxetanes, oxolanes (e.g., tetrahydrofuran), and the like may be used to advantage, for example.

Preferred polyethers are polyethers containing one or more terminal hydroxyl groups. Preferably, however, the polyether does not have a functionality greater than 2. That is, the use of polyethers having one or two terminal hydroxyl groups is desirable. Monofunctional polyethers are most preferred for use since problems with undesirable gelling of the reaction product are thereby minimized. The precise molecular weight of the polyether reactant is not considered critical, but may typically range from 500 to 10,000 (number average). Suitable polyethers thus include, but are not limited to, mono- and di- functional polypropylene glycols, polyethylene glycols, and ethylene oxide-propylene oxide copolymers. The composition and molecular weight of the polyether are desirably selected such that the cement additive obtained from the polyether is water-soluble.

Polyethers corresponding to the foregoing description are well-known in the art and may be readily obtained from a number of commercial sources. Methods for their preparation include, for example, the base-catalyzed or double metal cyanide-catalyzed reaction of $C_2$–$C_4$ epoxide(s) with a suitable initiator such as a mono-alcohol or glycol or other such substance having one or more active hydrogen atoms. The polyether may also be a recycled material recovered by glycolysis or hydrolysis from a polyurethane foam or the like.

The precise relative proportions of the foregoing reactants are not critical, except that the number of equivalents of polyether reacted should be less than the number of equivalents of the carboxyl groups in the carboxylic acid polymer. That is, the number of hydroxyl groups in the former reactant per carboxyl group in the latter reactant is selected to be less than 1, more preferably, less than 0.5, most preferably, less than 0.3. The equivalent ratio of carboxyl groups in the carboxylic acid polymer to hydroxyl groups in the polyether is preferably from 20:1 to 2:1.

The aforedescribed polyether and carboxylic acid polymer are reacted under conditions effective to achieve partial cleavage of the polyether and esterification of the polyether and cleavage products thereof by the latter reactant. While the precise mechanism of said reaction and chemical structure of the resulting product are not known, it is believed that cleavage of some, but not all, of the ether linkages of the polyether takes place and that the resulting cleavage products ultimately participate in the desired esterification of the acid groups originally present in the carboxylic acid polymer. Where the polymerized acid monomer is present in alkyl ester form (i.e., $R^2$ in the aforedescribed structure is $C_1$–$C_4$ alkyl), the esterification process may be alternatively described as interesterification wherein the $C_1$–$C_4$ alkyl group is displaced by the polyether or cleavage products thereof. It is preferred that the majority of the ether linkages in the starting polyether remain uncleaved. In one embodiment of the invention, only from about 1 to 25% of such linkages undergo cleavage.

The desired reaction of the polyether and carboxylic acid polymer is catalyzed by a strong protic acid. Suitable protic acids are those substances having a pKa less than 0. Generally, the acid will be a stronger acid than a carboxylic acid. Preferred strong protic acids include arylsulfonic acids, alkylsulfonic acids, and sulfonic acid ion exchange resins. Inorganic as well organic acids may be utilized; the acid may be soluble or insoluble in the reaction mixture. Other suitable acids are hydrogen halides, halosulfonic acids, tetrafluoroboric acid, heteropolyacids, and sulfuric acids. Mixtures of different acids can be used. Illustrative examples of acids useful in the present invention include, but are not limited to, p-toluene sulfonic acid, trifluoromethanesulfonic acid, methane sulfonic acid, hydrochloric acid, phosphotungstic acid, "Nafion" resins, "Amberlyst 15" resin, and the like. The protic acid may be added in salt form (e.g., zinc triflate), such that the acid is generated in situ by interaction with the carboxylic acid polymer.

The protic acid is used in an amount effective to promote the aforedescribed cleavage and esterification reactions. The preferred amount to be employed depends upon many factors, including the desired reaction rate, the types of reactants and catalyst used, reaction temperature, and other considerations. Generally, suitable amounts of protic acid are within the range of about 0.01 to 1 weight percent based on the quantity of polyether to be reacted.

The process of the invention is conveniently performed by combining the polyether, carboxylic acid polymer, and strong protic acid catalyst in any desired order or manner and heating the mixture at a temperature sufficient to cause the desired cleavage and esterification to proceed at sufficiently rapid rates. The progress of the esterification reaction can be followed by measuring the acid number, which will decrease as esterification proceeds, by conventional wet chemical analytical techniques. Generally, it will be advantageous to conduct said reaction until from 1 to 50% (more typically, 2 to 20%) of the carboxyl groups initially present in the carboxylic acid polymer are esterified.

Where the polyether is comprised of repeating oxypropylene units derived from propylene oxide, the extent of polyether cleavage may be conveniently checked by monitoring the level of head-to-head ether linkages in the polyether by NMR. Such head-to-head linkages are apparently more susceptible to cleavage than head-to-tail linkages. The extent of reaction (i.e., esterification plus cleavage) may also be estimated by measurement of the acid number. When a desirable level of esterification and cleavage is achieved, the acid number will typically be less than the theoretical acid number (calculated from the relative proportions and functionalities of the starting materials) which would be attained if esterification of the original polyether, but not any cleavage products thereof, had been completed.

The temperature selected should be sufficiently high so as to promote both the desired cleavage and esterification. While the minimum temperature required for such purpose will vary depending upon a number of factors, it has been found that where the polyether is derived in whole or in part from propylene oxide, the ethylenically unsaturated carboxylic acid polymer is derived in whole or in part from acrylic acid, and the strong protic acid is a sulfonic acid, temperatures in excess of 140° C. (more preferably, 150° C. to 250° C.) are needed. In one embodiment of the invention, the reaction mixture is first heated to a somewhat lower temperature (e.g., 75° C. to 140° C.) for a period of time sufficient to accomplish substantial esterification (but not a significant amount of cleavage) of the initially charged polyether, followed by heating at a temperature effective to cause polyether cleavage.

Esterification may be favored by removing the water or other by-products formed as a result of esterification from the reaction mixture (as well as any water present in the reactants initially) by appropriate means such as distillation or the like. Application of vacuum or an inert gas sparge may be helpful.

Once the appropriate degree of esterification and cleavage has been attained (typically, from about 0.5 to 18 hours), purification or further modification of the reaction product may be performed prior to its use as a cement additive. For example, the strong protic acid may be removed by any suitable method such as filtration, neutralization, or the like. The residual carboxylic acid groups in the additive may be either left in the acid form, or, if so desired, converted in whole or part to the salt form by reaction with a suitable source of alkali metal (e.g., sodium hydroxide, potassium hydroxide), alkaline earth metal (e.g., calcium hydroxide), ammonium (e.g., ammonia, alkyl amines such as triethanol amine and triisopropanol amine) or the like. The cation in the resulting salt thus may be an alkali metal cation. Ammonium as well as alkaline earth metal cations may also serve as the cation for such purpose. If the acid monomer used to prepare the carboxylic acid polymer was in ester or anhydride form, some or all of the ester or anhydride groups which may still be present in the polymer after reaction with the polyether may be converted into free acid or salt form by hydrolysis or other such means using methods conventional in the art.

The cements with which the additives of the invention may be used are hydraulic cements, meaning cements which, when made into a paste with water, set and harden as a result of chemical reactions between the water and cement. Suitable cements include ordinary, quick-hardening, and moderate-heat portland cements, alumina cement, blast-furnace slag cement, and flash cement. Of these, portland cements of the ordinary and quick-hardening types are particularly desirable.

The quantity of additive used may vary with factors such as the degree of esterification and polyether cleavage attained and the relative amount of polyether reacted with the carboxylic acid polymer. The additive quantity to be used in accordance with the invention is usually in the range of 0.01–10%, preferably 0.05 to 2%, based on the weight of dry cement. The quantity of water to be used for setting the cement is not critical; generally weight ratios of water to cement in the range 0.25:1 to 0.7:1, preferably 0.3:1 to 0.5:1 are satisfactory. Where desired, an aggregate such as pebbles, gravel, sand, pumice, or fired pearlite or mixtures thereof may be employed in conventional amounts.

Advantageously, the additives of this invention, which function as water reducing agents and/or superplasticizers, are used in combination with other known cement additives.

Among the optionally employable additional additives are: conventional hardening accelerators, e.g., metal chlorides such as calcium chloride and sodium chloride, metal sulfates, such as sodium sulfate, and organic amines such as triethanol-amine; ordinary hardening retarders, e.g. alcohols, sugars, starch and cellulose; reinforcing-steel corrosion inhibitors such as sodium nitrate and calcium nitrite; other water reducing agents such as ligninsulfonic acid salts, as well as salts of oxycarboxylic acid and formalin condensates of naphthalenesulfonic acid; air entrainers; other super plasticizers; shrinkage reducing agents; strength enhancers such as triisopropylamine; antifoaming agents such as tributyl phosphate; and the like. The quantity of such an optional ingredient or ingredients is usually 0.1–6% by weight of the cement.

The manner of adding the additive of the invention to the cement may be the same as with ordinary cement admixtures. For example, the additive can be admixed with a suitable proportion of water and the resulting solution is mixed with cement and aggregate. As an alternative, a suitable amount of the additive may be added when cement, aggregate and water are mixed. Another method of introducing the additive is to add it to the dry cement prior to or after grinding the cement clinker.

The concrete and the like incorporating the additive according to the invention may be applied in conventional ways. For example, it may be trowelled, filled in forms, applied by spraying, or injected by means of a caulking gun. Hardening or curing of the concrete and the like may be by any of the air drying, wet air, water and assisted (steam, autoclave, etc.) curing techniques. If desired, two or more such techniques may be combined. The respective curing conditions may be the same as in the past.

EXAMPLES

Example 1

Poly(acrylic acid) (200 g) having a number average molecular weight of approximately 2000 was dissolved in 200 g distilled water and then mixed with a monofunctional polyether (800 g) having a number average molecular weight of approximately 2000 and p-toluene sulfonic acid (8 g). The monofunctional polyether was prepared by reacting methanol with ethylene oxide and propylene oxide (70:30 molar ratio) in the presence of an alkali metal catalyst. The reaction mixture was heated to 180° C. while water was taken overhead and then held at 180° C. for 3 hours. The resulting reaction product had an acid number of 77 and was found to be useful as a cement additive to increase the fluidity of cement paste, mortar, or concrete either in acid form or as an aqueous solution of the sodium salt.

Example 2 (Comparative)

For comparative purposes, the procedure of Example 1 was repeated except that the reaction mixture was heated to 140° C. over 4 hours while water was distilled overhead and then held at 140° C. for another hour. The resulting reaction product had an acid number of 121, indicating that a lower degree of esterification was achieved than in Example 1.

Example 3

The reaction products of Examples 1 and 2 were tested in fully neutralized sodium salt form (25% aqueous solutions) in mortar mixes. Slump was measured using a half-size slump cone; air content was determined by ASTM method C185. The results, which are summarized in the following table, indicate that, the sodium salt form of the Example 1 reaction product of was capable, even at low levels, of greatly increasing the slump of the mortar mix at a given water/cement ratio over the slump observed in the absence of the additive. Additionally, the results demonstrate that the water/cement ratio can be reduced by as much as 16% using the additive of the invention while maintaining an equivalent level of slump.

| Additive | Water/cement | wt % additive on dry cement | slump, mm | air, % |
| --- | --- | --- | --- | --- |
| none | 0.42 | 0 | 20 | 9 |
| none | 0.50 | 0 | 83 | 3 |
| Example 1 | 0.42 | 0.1 | 73 | 10 |
| Example 1 | 0.42 | 0.3 | 97 (94)* | 10 (4)* |
| Example 2 | 0.42 | 0.3 | 25 | 9 |

*0.03 weight % tributyl phosphate (defoamer) as additionally present

Example 4

The reaction product of Example 1 was tested in sodium salt form in a concrete mix. The performance of the reaction product as a cement additive as compared to a control (no additive) and a commercially available superplasticizer is summarized in the following table. Adjusting for the differences in air content, the reaction product of Example 1 gave comparable slump to the commercial superplastizer at one-half the dosage level. The Example 1 reaction product also held its slump with time more effectively than the commercial superplasticizer. Set times with the Example 1 reaction product were comparable to the control (no additive) trials, but compressive strength was much improved.

| Additive | Water/Cement | Additive Dosage % Solids on cement | Slump, in | Air, % | Initial set, hrs. | Final set, hrs. | Time to total slump loss (¼") | Compressive strength, psi | |
| --- | --- | --- | --- | --- | --- | --- | --- | --- | --- |
| | | | | | | | | 1 day | 7 day |
| none | 0.46 | 0 | 4.25 | 6 | 5.1 | 6.9 | 4 | 2000 | 4020 |
| Example 1 | 0.40 | 0.2 | 2.75 | 4.3 | 4.9 | 6.9 | 2.5 | 4030 | 6680 |
| Rheobuild 1000 | 0.40 | 0.4 | 4.75 | 7 | 3.9 | 6.6 | 0.8 | 2670 | 4610 |

Example 5

A 3000 molecular weight copolymer of acrylic acid and maleic acid (50 g of a 50% aqueous solution) was combined with the monofunctional polyether used in Example 1 (100 g) and p-toluene sulfonic acid (1 g). The reaction mixture was heated to 110° C. to drive off water overhead and then held at 150° C. for 1 hour. The resulting reaction product had an acid number of 133. The acid number value was somewhat lower than the theoretical acid number (139) calculated based on the relative proportions of the reactants and the assumption that complete esterification (but no cleavage) of the monofunctional polyether had taken place. The lower acid number confirms that partial cleavage of the monofunctional polymer and esterification of the resulting cleavage products by the acrylic acid-maleic acid copolymer occurred. When tested in sodium salt form in accordance with Example 3 (wt % additive on dry cement=0.3; water/cement ratio=0.42), a slump of 72 mm and an air content of 8.0% were observed. When the foregoing reaction was repeated using a reaction time of 2 hours at 150° C., the product obtained had an acid number of 107 and produced a slump of 65 mm at an air content of 7.2%.

Example 6

A 2000 molecular weight polyacrylic acid (39 g of a 65% aqueous solution) was combined with "Pluracol W5100N" (a 3600 number average molecular weight n-butyl terminated monofunctional polyether comprised of about 58% ethylene oxide and 42% propylene oxide sold by BASF; 100 g) and p-toluene sulfonic acid (1 g). The reaction mixture was heated to 110° C. to drive off water, then held at 180° C. for 2 hours. The resulting reaction product had an acid number of 70. The acid number value was substantially lower than the theoretical acid number (114) calculated based on the relative proportions of the reactants and the assumption that complete esterification of the original monofunctional polyether had taken place. The significantly lower acid number confirms that partial cleavage of the monofunctional polymer and esterification of the cleavage products by the poly(acrylic acid) occurred. When tested in sodium salt form in accordance with Example 3 (0.3 wt % additive; water/cement ratio=0.42), a slump of 69 and an air content of 10.9% were observed.

I claim:

1. A cement additive containing carboxylic acid groups produced by reaction of (a) a carboxylic acid polymer prepared by polymerizing a polymerizable acid monomer containing at least one ethylenically unsaturated group in conjugation with a carboxyl group selected from the group consisting of carboxylic acid, carboxylic anhydride and carboxylic ester groups and (b) a polyether prepared by polymerizing a $C_2$–$C_4$ epoxide, wherein (a) and (b) are reacted under conditions effective to achieve partial cleavage of the polyether and esterification of the polyether and cleavage products thereof by the carboxylic acid polymer.

2. The cement additive of claim 1 wherein at least a portion of the carboxylic acid groups are in salt form.

3. The cement additive of claim 1 wherein the polymerizable acid monomer is selected from the group consisting of methyl acrylate, methyl methacrylate, acrylic acid, methacrylic acid, maleic acid, maleic anhydride and mixtures thereof.

4. The cement additive of claim 1 wherein the carboxylic acid polymer has a number average molecular weight of from 500 to 2,000,000.

5. The cement, additive of claim 1 wherein the $C_2$–$C_4$ epoxide is selected from the group consisting of ethylene oxide, propylene oxide, and mixtures thereof.

6. The cement additive of claim 1 wherein the polyether has a hydroxyl functionality of 1 or 2.

7. The cement additive of claim 1 wherein the polyether has a number average molecular weight of from 200 to 10,000.

8. The cement additive of claim 1 wherein the polymerizable acid monomer has the structure

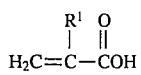

wherein $R^1$ is hydrogen or $C_1$–$C_4$ alkyl.

9. The cement additive of claim 1 wherein the polymerizable acid monomer comprises at least 25 mole percent of the carboxylic acid polymer.

10. The cement additive of claim 1 wherein carboxyl groups in the carboxylic acid polymer and hydroxyl groups in the polyether are present in an equivalent ratio of from 20:1 to 2:1.

11. The cement additive of claim 1 wherein the polymerizable acid monomer comprises 100 percent of the carboxylic acid polymer.

12. The cement additive of claim 1 wherein the carboxylic acid polymer is selected from the group consisting of poly(acrylic acid) poly(ethylene-co-acrylic acid), poly(ethylene-co-methacrylic acid), poly(ethylene-co-maleic anhydride), poly(methylmethacrylate-co-methacrylic acid), and poly(maleic acid-co-acrylic acid).

13. The cement additive of claim 1 wherein the polyether is selected from the group consisting of monofunctional polypropylene glycols, difunctional polypropylene glycols, monofunctional polyethylene glycols, difunctional polyethylene glycols, monofunctional ethylene oxide-propylene oxide copolymers, and difunctional ethylene oxide-propylene oxide copolymers.

14. A cement composition comprised of cement and from 0.01 to 10% by weight based on the weight of cement of the cement additive of claim 1.

15. A concrete composition comprised of cement, aggregate, and from 0.01% to 10% by weight based on the weight of cement, of the cement additive of claim 1.

16. A method of increasing the fluidity of a hydraulic cement composition comprising adding from 0.01 to 10% by weight based on the weight of dry cement of the cement additive of claim 1 to the hydraulic cement composition.

17. A cement additive containing carboxylic acid groups produced by reaction of (a) a carboxylic acid polymer selected from the group consisting of polyacrylic acid and poly(maleic acid-co-acrylic acid) and (b) a monofunctional ethylene oxide-propylene oxide copolymer having a number average molecular weight of from 200 to 10,000, wherein (a) and (b) are reacted under conditions effective to achieve partial cleavage of the polyether and esterification of the polyether and cleavage products thereof by the carboxylic acid polymer.

18. The cement additive of claim 17 wherein at least a portion of the carboxylic acid groups are in salt form.

19. A method for producing a cement additive containing carboxylic acid groups comprising reacting (a) a carboxylic acid polymer prepared by polymerizing a polymerizable acid monomer containing at least one ethylenically unsaturated group in conjugation with a carboxyl group selected from the group consisting of carboxylic acid, carboxylic anhydride, and carboxylic ester groups and (b) a polyether prepared by reacting a $C_2$–$C_4$ epoxide, said reacting of (a) and (b) being performed in the presence of a protic acid catalyst having a pKa of less than 0 for a time and at a temperature effective to achieve partial cleavage of the polyether and esterification of the polyether and cleavage products thereof by the carboxylic acid polymer to form the cement additive.

20. The method of claim 19 wherein the protic acid catalyst is selected from the group consisting of arylsulfonic acids, alkyl sulfonic acids, sulfonic acid ion exchange resins, and salts thereof.

21. The method of claim 19 wherein the temperature is greater than 140° C.

22. The method of claim 19 comprising the additional step of converting at least a portion of the carboxylic acid groups to salt form.

23. The method of claim 19 wherein carboxyl groups in the carboxylic acid polymer and hydroxyl groups in the polyether are present in an equivalent ratio of from 20:1 to 2:1.

24. The method of claim 19 wherein the polymerizable acid monomer has the structure

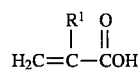

wherein $R^1$ is hydrogen or $C_1$–$C_4$ alkyl.

* * * * *